(12) United States Patent
Mee (10) Patent No.: US 12,327,248 B2
(45) Date of Patent: Jun. 10, 2025

(54) PLATFORM FOR A PLURALITY OF SERVICES ASSOCIATED WITH A BLOCKCHAIN

(71) Applicant: nChain Licensing AG, Zug (CH)

(72) Inventor: Andrew James Mee, London (GB)

(73) Assignee: nChain Licensing AG, Zug (CH)

(*) Notice: Subject to any disclaimer, the term of this patent is extended or adjusted under 35 U.S.C. 154(b) by 42 days.

(21) Appl. No.: 18/388,762

(22) Filed: Nov. 10, 2023

(65) Prior Publication Data

US 2024/0086914 A1 Mar. 14, 2024

Related U.S. Application Data

(62) Division of application No. 17/800,857, filed as application No. PCT/IB2021/051261 on Feb. 15, 2021, now Pat. No. 11,880,839.

(30) Foreign Application Priority Data

Feb. 19, 2020 (GB) ...................................... 2002285

(51) Int. Cl.
*G06Q 20/40* (2012.01)
*G06F 9/54* (2006.01)
(Continued)

(52) U.S. Cl.
CPC ........... *G06Q 20/401* (2013.01); *G06F 9/542* (2013.01); *G06F 9/547* (2013.01); *H04L 7/02* (2013.01);
(Continued)

(58) Field of Classification Search
CPC .......... H04L 9/3242; H04L 63/12; H04L 9/50
See application file for complete search history.

(56) References Cited

U.S. PATENT DOCUMENTS 11,836,817 B2 * 12/2023 Hunn ...................... H04L 63/12
2017/0230353 A1 8/2017 Kurian et al.
(Continued)

FOREIGN PATENT DOCUMENTS

| JP | 2019522264 | | 8/2019 |
| WO | 2019067989 | A1 | 4/2019 |
| WO | 2020016739 | A1 | 1/2020 |

OTHER PUBLICATIONS

Klinkmüller, Christopher, et al. "Efficient logging for blockchain applications." arXiv preprint arXiv:2001.10281 (2020) (Year: 2020).*

*Primary Examiner* — Chirag R Patel
(74) *Attorney, Agent, or Firm* — Messner Reeves LLP (57) ABSTRACT

In a first aspect, the present disclosure proposes methods, devices and systems for implementing a platform providing a plurality of services that are associated with a blockchain, using a platform processor associated with an application programming interface (API) that is capable of receiving a client request in a Hypertext Transfer Protocol (HTTP) transmission protocol format for a service. Further to suitable verification of the identity of the client and/or the request, a destination address or endpoint for the requested blockchain service is determined, and at least one blockchain transaction is generated based on the destination address to obtain an output script. A result based on the output script is then sent to the given client in the HTTP transmission protocol format. In some aspects, the blockchain transaction is associated with an event stream that is implemented as a Finite State Machine on the blockchain.

20 Claims, 6 Drawing Sheets

(51) Int. Cl.
*H04L 7/02* (2006.01)
*H04L 9/00* (2022.01)
*H04L 67/02* (2022.01)
*G06Q 20/36* (2012.01)

(52) U.S. Cl.
CPC ............... *H04L 9/50* (2022.05); *H04L 67/02* (2013.01); *G06Q 20/36* (2013.01); *G06Q 2220/00* (2013.01)

(56) References Cited

U.S. PATENT DOCUMENTS

| | | |
|---|---|---|
| 2018/0253703 A1 | 9/2018 | Smith et al. |
| 2019/0065685 A1* | 2/2019 | Pickover ................ G16H 10/60 |
| 2019/0102409 A1 | 4/2019 | Shi et al. |
| 2019/0102423 A1* | 4/2019 | Little ................... G06Q 20/382 |
| 2019/0303920 A1 | 10/2019 | Balaraman et al. |

\* cited by examiner

PLATFORM FOR A PLURALITY OF SERVICES ASSOCIATED WITH A BLOCKCHAIN

CROSS REFERENCE TO RELATED APPLICATIONS

This application is a divisional of U.S. application Ser. No. 17/800,857 filed on Aug. 18, 2022, which is the U.S. National Stage of International Application No. PCT/IB2021/051261 filed on Feb. 15, 2021, which claims the benefit of United Kingdom Patent Application No. 2002285.1, filed on Feb. 19, 2020, the contents of which are incorporated herein by reference in their entireties.

TECHNICAL FIELD

This disclosure relates generally to methods and systems for implementing a platform of one or more services associated with a distributed ledger, i.e. a blockchain, for one or more clients. Particularly, the present disclosure relates, but is not limited to, the provision of access to a plurality functions and applications associated with a blockchain for one or more clients, such as the implementation of event streams or machine-readable contracts.

BACKGROUND

In this document we use the term 'blockchain' to include all forms of electronic, computer-based, distributed ledgers. These include consensus-based blockchain and transaction-chain technologies, permissioned and un-permissioned ledgers, shared ledgers, public and private blockchains, and variations thereof. The most widely known application of blockchain technology is the Bitcoin ledger, although other blockchain implementations have been proposed and developed. While Bitcoin may be referred to herein for the purpose of convenience and illustration, it should be noted that the disclosure is not limited to use with the Bitcoin blockchain, and alternative blockchain implementations and protocols associated with any kind of digital asset or a representation of a digital asset fall within the scope of the present disclosure. The terms "client", "entity", "node", "user", "sender", "recipient", "payer", "payee" may refer herein to a computing or processor-based resource. The term "Bitcoin" is used herein to include any version or variation that derives from or is based on the Bitcoin protocol. The term "digital asset" may refer to any transferrable asset, such as cryptocurrency, tokens representing at least a part of a property, a smart contract, a license, i.e. software license, or DRM contracts for media content, etc. It will be understood that the term "digital asset" is used throughout this document to represent a commodity that may be associated with a value, which may be transferred to or provided as a payment in a transaction from one entity to another.

A blockchain is a peer-to-peer, electronic ledger, which is implemented as a computer-based, decentralised, distributed system made up of blocks, which in turn are made up of transactions. Each transaction is a data structure that encodes the transfer of control of a digital asset between participants in the blockchain system and includes at least one input and at least one output. Each block contains a hash of the previous block so that blocks become chained together to create a permanent, unalterable record of all transactions which have been written to the blockchain since its inception. Transactions contain small programs known as scripts, embedded into their inputs and outputs, which specify how and by whom the outputs of the transactions can be accessed. On the Bitcoin platform, these scripts are written using a stack-based scripting language.

In order for a transaction to be written to the blockchain it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid, and the transaction is then written to the blockchain. Thus, in order for a transaction to be written to the blockchain, it must be i) validated by the first node that receives the transaction—if the transaction is validated, the node relays it to the other nodes in the network; ii) added to a new block built by a miner; and iii) mined, i.e. added to the public ledger of past transactions.

It will be appreciated that the nature of the work performed by miners will depend on the type of consensus mechanism used to maintain the blockchain. While proof of work (PoW) is associated with the original Bitcoin protocol, it will be appreciated that other consensus mechanisms, such as, proof of stake (PoS), delegated proof of stake (DPoS), proof of capacity (PoC), proof of elapsed time (PoET), proof of authority (PoA) etc. may be used. Different consensus mechanisms vary in how mining is distributed between nodes, with the odds of successfully mining a block depending on e.g. a miner's hashing power (PoW), an amount of cryptocurrency held by a miner (PoS), an amount of cryptocurrency staked on a delegate miner (DPoS), a miner's ability to store pre-determined solutions to a cryptographic puzzle (PoC), a wait time randomly assigned to a miner (PoET), etc. Typically, miners are provided with an incentive or reward for mining a block. The Bitcoin blockchain, for example, rewards miners with newly issued cryptocurrency (Bitcoin) and fees associated with transactions in the block (transaction fees). For the Bitcoin blockchain, the amount of cryptocurrency issued diminishes with time, with the incentive eventually consisting of transaction fees only. It will be appreciated, therefore, that the handling of transaction fees is a part of the underlying mechanism for committing data to public blockchains such as the Bitcoin blockchain.

As mentioned previously, each transaction in a given block encodes the transfer of control of a digital asset between participants in the blockchain system. The digital asset need not necessarily correspond to a cryptocurrency. For example, the digital asset may pertain to a digital representation of a document, image, physical object, etc. The payment of cryptocurrency and/or transaction fees to miners may simply act as an incentive to maintain the validity of the blockchain by performing the necessary work. It may be that the cryptocurrency associated with the blockchain acts as a security for miners, with the blockchain itself being a ledger for transactions that predominantly relate to digital assets other than cryptocurrency. In some cases, it may be that the transfer of cryptocurrency between participants is handled by an entity that is different from and/or independent of the entity using the blockchain to maintain a ledger of transactions.

Once stored in the blockchain as a UTXO, a user can transfer control of the associated resource to another address associated with an input in another transaction. This transfer is usually, but not essentially, done using a digital wallet. This digital wallet may be a device; physical medium; program; application (app) on a computing device such as a desktop, laptop or a mobile terminal; or a remotely-hosted service, associated with a domain on a network, such as the Internet. The digital wallet stores public and private keys and can be used to track ownership of resources; tokens and assets etc., that are associated with a user; receive or spend digital assets; transfer tokens which may relate to digital assets, such as cryptocurrencies, licenses, property, or other types of resource.

Although blockchain technology is most widely known for the use of cryptocurrency implementation, digital entrepreneurs are exploring the use of both the cryptographic security system Bitcoin is based on, and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper-proof records of events, distributed processing etc.) while being more versatile in their applications.

One area of current research is the use of the blockchain for the implementation of "smart contracts". These are computer programs designed to automate the execution of the terms of a machine-readable contract or agreement. Unlike a traditional contract which would be written in natural language, a smart contract is a machine-executable program, which comprises rules that can process inputs in order to produce results, which can then cause actions to be performed dependent upon those results. Another area of blockchain-related interest is the use of 'tokens' (or 'coloured coins') to represent and transfer real-world entities via the blockchain. A potentially sensitive or secret item can be represented by the token, which has no discernible meaning or value. The token thus serves as an identifier that allows the real-world item to be referenced from the blockchain.

The above-mentioned examples or scenarios, whilst making use of the advantages of the blockchain to provide a permanent, tamper-proof record of events; requires a client, client entity, computing devices, or a terminal associated with a client, to include or implement software and/or hardware, or a processor/module, such as a digital wallet for implementing functionality for managing digital assets, managing cryptographic keys for Elliptic Curve Digital Signature Algorithm (ECDSA) that are used, for example, by the BSV (Bitcoin Satoshi's Vision) Blockchain. In addition, there is also a requirement for the client device to be able to implement blockchain transaction construction and have access to BSV libraries. Thus, not only do clients need to include processing to implement such functionality, but they also need to ensure that appropriate security measures are implemented for such processes before they can make use of a blockchain network to send, receive, and view data, and/or digital assets, which relate to a smart contract or a token representing a real world asset transaction.

Accordingly, there is a desire to implement secure, low-complexity, user-friendly, efficient, and robust techniques, that will allow any client, whether computationally sophisticated or not, to be able to instantaneously access and interact with useful applications associated with the blockchain, in a simple, fast, accurate, reliable, and secure manner, that is computationally and functionally less onerous. More particularly, there is a desire to make use of distributed ledger (blockchain) technology, and the advantages of increased security, transparency, and reliability of records, to provide a common platform or interface for a plurality of blockchain related services or applications, that enable any client computing device to ensure any data, event, or digital asset associated with the client, can be instantaneously and securely mined, or written into the blockchain easily, thereby providing a lasting, tamper-proof, and auditable record of it, which can be created, written, updated, read, or viewed as required.

Such an improved solution has now been devised. The present disclosure addresses the above technical concerns by proposing one or more techniques, whereby data, or information associated with a client, may be simply, securely, and instantaneously written into, or obtained from the blockchain, by methods, devices, and systems which provide an application programming interface (API) for one or more services associated with a blockchain, without such clients needing to implement any processing or functionality for using the blockchain, while still being able to avail all advantages associated with the blockchain.

SUMMARY

In a first aspect, the present disclosure proposes methods, devices, and systems for implementing a platform, that provides a plurality of services associated with a blockchain; using a platform processor associated with an application programming interface (API), that is capable of receiving a client request in a Hypertext Transfer Protocol (HTTP) transmission protocol format for a service. Further to suitable verification of the identity of the client and/or the request, a destination address, or endpoint for the requested blockchain service, is determined, and at least one blockchain transaction is generated based on the destination address in order to obtain an output script. A result based on the output script is then sent to the given client in the HTTP transmission protocol format.

In a second aspect, the present disclosure proposes methods, devices, and systems for implementing a data-writing service, for transactions associated with a blockchain for a client, based on an HTTP request from the client, and relating to an event stream ES, implemented using the blockchain, where the event stream may be used to representor track a Finite State Machine (FSM). For example, this FSM may be a smart contract. The current state of the event Stream $ES_n$ on the blockchain is determined, a new or next event $E_{n+1}$ for the event stream ES, is identified in the received request, and processed by creating a blockchain transaction, including an input associated with a transaction output from a previous transaction TX, for the event stream ES; and an unspent output UTXO, associated with event data representing the new event $E_{n+1}$. Once submitted to the blockchain, the current state of the event stream on the blockchain is updated to be $ES_{n+1}$, based on the new event $E_{n+1}$. A result associated with current state $ES_{n+1}$, the result being provided in the HTTP transmission protocol format.

Throughout this specification the word "comprise", or variations such as "includes", "comprises", or "comprising", will be understood to imply the inclusion of a stated element, integer, step, or group of elements, integers, or steps, but not the exclusion of any other element, integer, step, or group of elements, integers, or steps.

BRIEF DESCRIPTION OF THE DRAWINGS

Aspects and embodiments of the present disclosure will now be described, by way of example only, and with reference to the accompany drawings, in which.

DETAILED DESCRIPTION

In accordance with a first aspect, the present disclosure provides a computer implemented method for providing a platform of a plurality of services that are associated with a blockchain, the platform being provided for a plurality of clients, the method implemented by a platform processor associated with an application programming interface (API).

Advantageously, the platform processor API allows for web-based interaction interface, i.e. it may in some embodiments be implemented as a web service for the one or more clients, such that communication may take place over the Internet using standard Internet communication protocols for web-based services. For instance, in some embodiments, whereby HTTP messages or requests in an application level, or layer between a client and a server (the platform service in this case), such as HTTP, HTTPS etc. may be transmitted and received based on transport layer protocols, such as TCP/IP etc. The reference to HTTP transmission protocols, or HTTP API, herein also encapsulates all standard Internet communication protocols, such as TCP/IP, UDP, HTTPS, etc.

In some embodiments the platform processor is implemented as an HTTP API endpoint. In some embodiments the platform processor is implemented as a Representational State Transfer (REST) endpoint. Advantageously, the API may be implemented as a REST endpoint, thereby also allowing the client to communicate using standard Internet or web-based protocols, such as HTTP or HTTPS.

The method of the first aspect comprises the steps of receiving a request from a given client among the plurality of clients, the request pertaining to a given service among the plurality of services, and from the given client being based on a Hypertext Transfer Protocol (HTTP) transmission protocol format. Then, based on a determination that the client identity and/or request(s) is/are valid, the method includes obtaining a destination address associated with the given service. In some embodiments, the destination address may be an IP address or a network address endpoint. For example, this may be an endpoint universal resource identifier (URI) and may include the universal resource location (URL) of a web server, from where the requested service may be accessed by the payment processor or one or more other entities (including the client) for the requested service.

In some embodiments, this destination address may be the same endpoint as the platform API endpoint. This may be the case if the platform offers such a requested service as that of a main or core service. In other embodiments, where there are multiple different types of services offered by the platform, each implemented by different processors or webservers, then the destination address may be different to the platform API, which may act as a host server for other processor and webservers that are associated with the platform. In this case, a platform processor comprises or is associated with a plurality of processors, each configured for implementing a given service among the plurality of services on the blockchain, and each being associated with a specific destination address or endpoint that is unique to the respective processor.

The method of the first aspect further includes the step of processing the request for the given service, based on at least one blockchain transaction corresponding to the obtained destination address to obtain an output script. In some embodiments, the output script is associated with data relating to the requested service, or the result of the service requested is included in a UTXO and includes such data or digital asset for the transaction.

In the first aspect, this result associated with the output script is then sent to the given (requesting) client in the HTTP or similar transmission protocol format.

Advantageously, the method of the first aspect of the present disclosure, by implementing a platform that is provided as an API for one or more clients, allows one or more processor associated with a client to sign-up, or use a web service provided by the platform processor to write or access data into a blockchain. The one or more processors associated with the platform can implement one or more of the services being offered, using a standards-based interface design, such as, but not limited to, the REST (Representational State Transfer)—which is an architectural style for developing web services and web-based interactions. A resource, in the context of REST API, can be defined as an object with a type, associated data, relationships to other resources, and a set of methods that operate on it. Thus, the platform or services implemented by the platform processor of the first aspect is advantageously provided as an API implementation, to access the (state of a) blockchain or distributed ledger, such as the Bitcoin SV (BSV) blockchain, and to trigger operations or functions that can alter that state, via an application interface, and expose it as a REST API. In other words, one or more servers or processors associated with the platform may be considered as a REST endpoint for one or more clients that choose to use such service. Advantageously, the client can thus communicate with the platform service via HTTP or similar Internet commands. More advantageously, no BSV, Bitcoin, blockchain knowledge, ECDSA, or other cryptographic key-management libraries, or transaction construction software, such as digital wallet software etc., needs to be implemented by the client for any of the services offered. The client using one or more processing resources or user terminals can simply register to use the platform via some known authentication techniques, such as password protection authorisation or standard public key infrastructure (PKI) for verifying client identify. The client should then simply be able to communicate with the platform service via basic HTTP or similar.

In some embodiments, some examples of the services associated with the blockchain that can be provided via the platform are:
  data services, for writing/submitting data into the blockchain to alter a state of the blockchain;
  data services, for reading/obtaining data reflecting the current state of the blockchain;
  services associated with simplified payment verification, for transactions associated with the blockchain;

services associated with the management of one or more event streams and/or machine-readable contracts associated with the blockchain;

services associated with the management of a digital wallet framework, for a plurality of clients;

channel services associated with the provision of peer-to-peer communication channels;

storage services associated with data storage.

In the embodiments, where there are multiple processors or webservers associated with the platform processor of the first aspect, the method of the first aspect further comprises the step of providing an application programming interface (API) converter, for performing the steps of: receiving the request from the client in the HTTP transmission protocol format, converting a received request to a Remote Procedure Call (RPC) format, and sending the RPC request to a given processor among the plurality of processors, that is configured to implement the service identified in the received request. In a reverse flow path this embodiment includes receiving a response associated from the given processor in an RPC format, and converting the respective response to be sent to the client using the HTTP, or a similar transmission protocol.

This is advantageous as it allows the client to communicate requests that are associated with the blockchain via simple HTTP, using a web-based platform API, and seamlessly providing interoperability with any of the nodes or servers that implement the above described services, but that do not communicate using Internet protocol communication standards for web services. The API convertor implemented in this embodiment is not limited to HTTPS to RPC and vice versa conversion, or for that matter other web-based protocols to alternative communication protocols that are supported by the platform processors implementing one or more of the above services, networks for a given cryptocurrency, or digital assets that can otherwise be envisaged. In the reverse flow path, the method of the first aspect also includes receiving responses associated with the corresponding blockchain transaction from a respective processor in an RPC format, and accordingly, converting the respective responses using HTTP for sending on to the client. Thus, advantageously implementing the proposed interface by the platform processor enables seamless communication, for submitting transactions to the blockchain when the clients (payees) and miners use different wireless data communication protocols and mechanisms.

In some embodiments of the first aspect, the received request from the client is an HTTP GET or HTTP POST or HTTP PUT or HTTP PATCH request that includes or is associated with a client identifier, specific to a given client, as well as a service identifier for the given service requested among the plurality of services that are offered by the platform, as mentioned above. In some embodiments, the result sent to the client is an HTTP POST request based on the client identifier.

In some embodiments, to make client addressing for blockchain transactions simpler, there already exist mechanisms where a memorable and more user-friendly alias is used instead of the complicated public address for one or more client entities. Such a solution is proposed in U.S. patent application Ser. No. 16/384,696 and UK patent application number 1907180.2, both in the name of nChain Holdings Limited. These documents set out an alias-based payment service and associated protocols, referred to as bsvalias payment service, where an alias is used for destination addressing instead of the public address of a client entity. The alias in such a system is usually associated with a domain name of a sending/receiving client entity and may be a URI or an email address. Thus, as long as a sender or entity is aware of, or is provided with the alias, this is sufficient for the bsvalias payment system or an alias based addressing mechanism. Messages may be sent to the alias of a client, for instance, using instructions provided in a machine-readable resource, such as a JavaScript Object Notation JSON document, saved in a well-known URI or location for the bsvalias or other payment service. In some embodiments of the present disclosure, one or more of the plurality of clients may have an alias such as the above to identify the respective client.

In related embodiments, the method of the first aspect comprises validating the client based on the client identifier and a record corresponding to the client identifier, the record associated with the platform processor. For example, such record may have been created and stored in or associated with the platform processor at the time of client sign-up or registration. Then, based on a successful validation of the client, the method includes determining if the received request from the client is valid, based on the service identifier and an attribute or setting included in the respective record. In some embodiments, said attribute or setting may indicate whether or not a given client is allowed access to all or part of the requested service. For instance, one or more levels of permission associated with the client identifier may be provided in the attribute or setting. For example, a given client may be allowed to request services to read data that is on a blockchain for a specific event, but may not be allowed to modify, delete or terminate such event, whereas another client may have permission for all action pertaining to one or more services.

In some embodiments, the step of verifying the identity of a given client may be based on a digital signature associated with the client. Cryptographic key pairs, including a private key and a public key (or public address) associated with each client, may be used for verifying that a request made for a service did indeed originate from the given client, i.e. where data signed by a private key can only be recovered or validated using the corresponding public key. Standard public key infrastructure (PKI) techniques may be used and implemented if verification is based on a digital signature.

In some embodiments of the first aspect, a computer implemented method for accessing the platform of a plurality of services, as implemented by one or more processors of a given client among the plurality of clients, comprising the steps of obtaining or identifying an application programming interface (API) endpoint associated with one or more processors, associated with the platform, and sending a request pertaining to a given service among the plurality of services, the request including or associated with a client identifier for the given client, and a service identifier for the given service requested. As mentioned above, the request is sent using a Hypertext Transfer Protocol (HTTP) or similar transmission protocol format. The method also includes receiving a result pertaining to an output script of a blockchain transaction associated with the request, said result being provided to the client in the HTTP transmission protocol format.

In a second aspect, the present disclosure provides a computer-implemented method for implementing a data-writing service, for transactions associated with a blockchain, the method being implemented by a platform processor associated with an application programming interface (API), to enable clients to access the service to write data into a blockchain. The method of the second aspect comprises the steps of receiving a request from a client, the request relating to an event stream ES implemented using the blockchain, the request from the client being based on a Hypertext Transfer Protocol (HTTP) transmission protocol format. In some embodiments, the event stream may track or represent as a Finite State Machine (FSM), such as a Deterministic Finite Automaton (DFA), which is a well-known computing term, representing a system having a finite number of states, and which may be in only one state at a given time, with a transition function or a trigger event for transitioning from one stage to the next. In some embodiments such event stream is useful to represent a control means or technique of a technical process. In some embodiments, the event stream may represent or track the inputs, states and/or events associated with a machine-readable contract or smart contract on the blockchain, where, advantageously, an immutable record of the past and current state of the contract is recorded. In some embodiments, the request received from the client includes a trigger event, to enable a state transition to take place in a smart contract associated with the event stream.

The method of the second aspect comprises the step of determining a current state of the event Stream $ES_{i=n}$, wherein i is an integer from 0 to N, each integer i representing a given state of the event stream ES, whereby i=0 represents the created event stream ES, i=n represents the event stream ES in a current state in the blockchain, and i=N represents a final state of the event stream ES. In some embodiments, the determination of the current state may an indication of the present state based on a most recent result associated with the event stream, said result stored on the blockchain or in one or more separate off-chain storage resources for event stream. This may be based on an identifier of an earlier or pervious blockchain transaction associated with the event stream. If there is no previous state identified for the event stream then this will result in a determination that the current state is n=0, i.e. a new event stream is to be created. In some embodiments, the current state may also be retrieved or read from the blockchain. This may be performed by a data reader as explained above, which may be a service among the plurality of services provided by the platform processor.

In the method of the second aspect, processing a new event $E_{n+1}$ for the event stream ES, based on the received request, includes the step of creating a blockchain transaction $TX_{n+1}$, the blockchain transaction $TX_{n+1}$ including an input associated with a transaction output ($TXO_n$) from a previous transaction $TX_n$, and an unspent output ($UTXO_{n+1}$), associated with event data representing the new event $E_n$. In some embodiments, where n=0, no input that spends a previous output will exist. There may however be other inputs that represent digital assets associated with the event stream ES. The method then includes submitting the transaction $TX_{n+1}$ to the blockchain.

Once submitted, the current state of the event stream is updated to be based on the submitted blockchain transaction, i.e. the state will be updated to be $ES_{i=n+1}$ based on the newly created event $E_{n+1}$, such that $ES_{i=n}=ES_{n+1}$. In some embodiments, the updated state is based on data present in $UTXO_{n+1}$, the unspent output of the latest transaction in the event stream. The method then includes sending a result, based on the updated currented state of the event stream $ES_{n+1}$, the result being provided based on the HTTP transmission protocol format.

The second aspect of the present disclosure discusses the implementation of a data-writing service implemented by a platform processor, or in other words, the implementation enables the functionality of writing data associated with a real world process, such as controlling the states of a smart contract. The platform processor of the second aspect is associated to that discussed in the first aspect, wherein the second aspect discusses one of a plurality of blockchain services, i.e. for writing data into the blockchain to change its current state. As the request and the respect is received and provided using an API for the platform, the second aspect provides all the advantages associated with the first aspect. In addition, the data-writing service advantageously allows one or more clients to enable a transaction of state of a blockchain-implemented smart contract, by simply extracting the triggers or events from the effect. Thus, an immutable record of the various stages of the smart contract may be provided by the data writing service of the second aspect.

Aspects of the present disclosure also include a computing device comprising a processor and memory, the memory including executable instructions that, as a result of execution by the processor, causes the device to perform the computer-implemented method, as discussed above, where the computing device pertains to the platform processor.

Aspects of the present disclosure also include a computing device comprising a processor and memory, the memory including executable instructions that, as a result of execution by the processor, causes the device to perform the computer-implemented method, as discussed above, where the computing device pertains to client.

Aspects of the present disclosure also include a computer system comprising at least one platform processor communicatively coupled to at least one client via a wireless communication network, the at least one platform processor associated with an application programming interface (API) endpoint for processing HTTP requests from the at least one client, the at least one platform processor implemented in accordance with the computing device mentioned above; and the at least one client being implemented in accordance with the client computing device mentioned above.

Aspects of the present disclosure also include a computer-readable storage medium having stored thereon executable instructions that, as a result of being executed by a processor of a computer, cause the computer to perform the method of any of the aspects and embodiments set out above.

Some specific embodiments are now described by way of illustration with reference to the accompanying drawings, in which like reference numerals refer to like features.

First Aspect—Platform API for a Plurality of Services Associated with a Blockchain The platform processor for providing a plurality of services described above for the first aspect may be Platform as a Service (PaaS) and Software as a service (SaaS) offering that advantageously enables rapid delivery of useful real-world business and technical applications, such as management of software controlled technical systems or smart contracts, using a blockchain network such as the BSV blockchain. An overview of the platform services can be seen in FIG. 1 that shows a high-level schematic of the system. The platform services has a platform processor 100 that provides an API 108, via which the services may be accessed by one or more clients.

Figure 1:
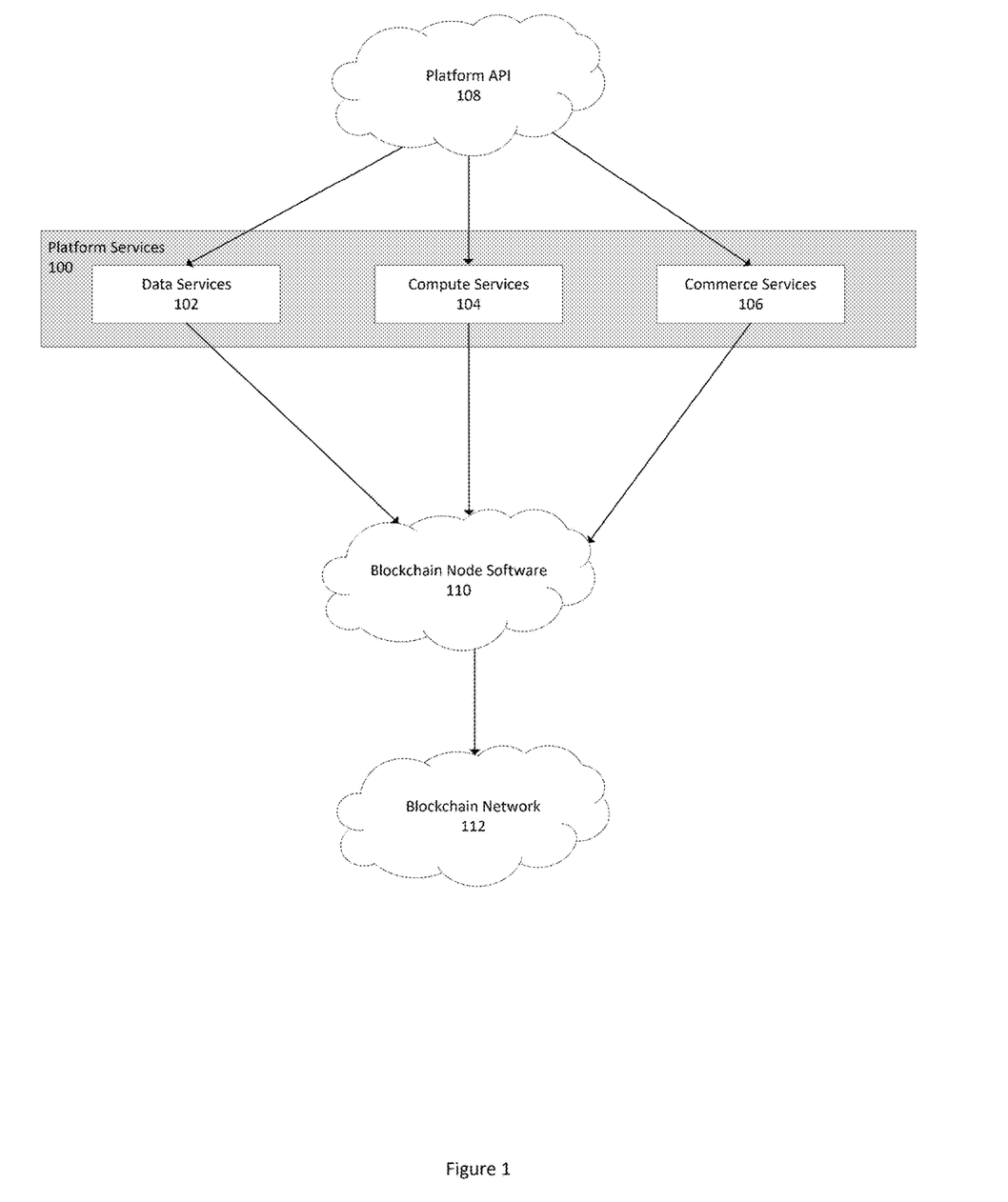
FIG. 1 is a schematic diagram, depicting an overview of a platform for a plurality of services associated with a blockchain, according to a first aspect.

Platform Services 100 as shown in this Figure are made up of three families of services and is aimed at allowing users and organisations to easily and securely make use of the advantages offered by the unique properties of a blockchain, without actually implementing any blockchain based software, knowledge or libraries at the client end. These services are:

Data Services 102 that aim to simplify the usage of the chain as a commodity data ledger.

Compute Services 104 that aim to provide a generalised compute framework backed by a digital asset such as Bitcoin SV.

Commerce Services 106 that provide enterprise-class capabilities for transacting using a digital asset such as Bitcoin SV Additional services that could be associated with the above core services, such as Simple Payment Verification (SPV) based services, channel services for peer to peer communication and/or storage services.

As mentioned above, requests may be received via or using the HTTPS protocol from a client at the API, as the API is implemented as a web service. The requested services are then implemented by the one or more service modules or processing resources 102-106 using underlying software 110, such underlying software 110 being associated with the blockchain, i.e. to implement resources, libraries and/or key-management wallet implementations for creating, processing and submitting transactions associated with the blockchain. Once processed, transactions can be submitted to the blockchain network 112 (instead of the client implementing any such functionality or transaction libraries). At most, the client may or can implement a digital wallet or the like associated with cryptocurrency or some other digital asset, but this is not essential as the platform service 100 may also be able to provide and manage the digital asset for the client.

Figure 2A:
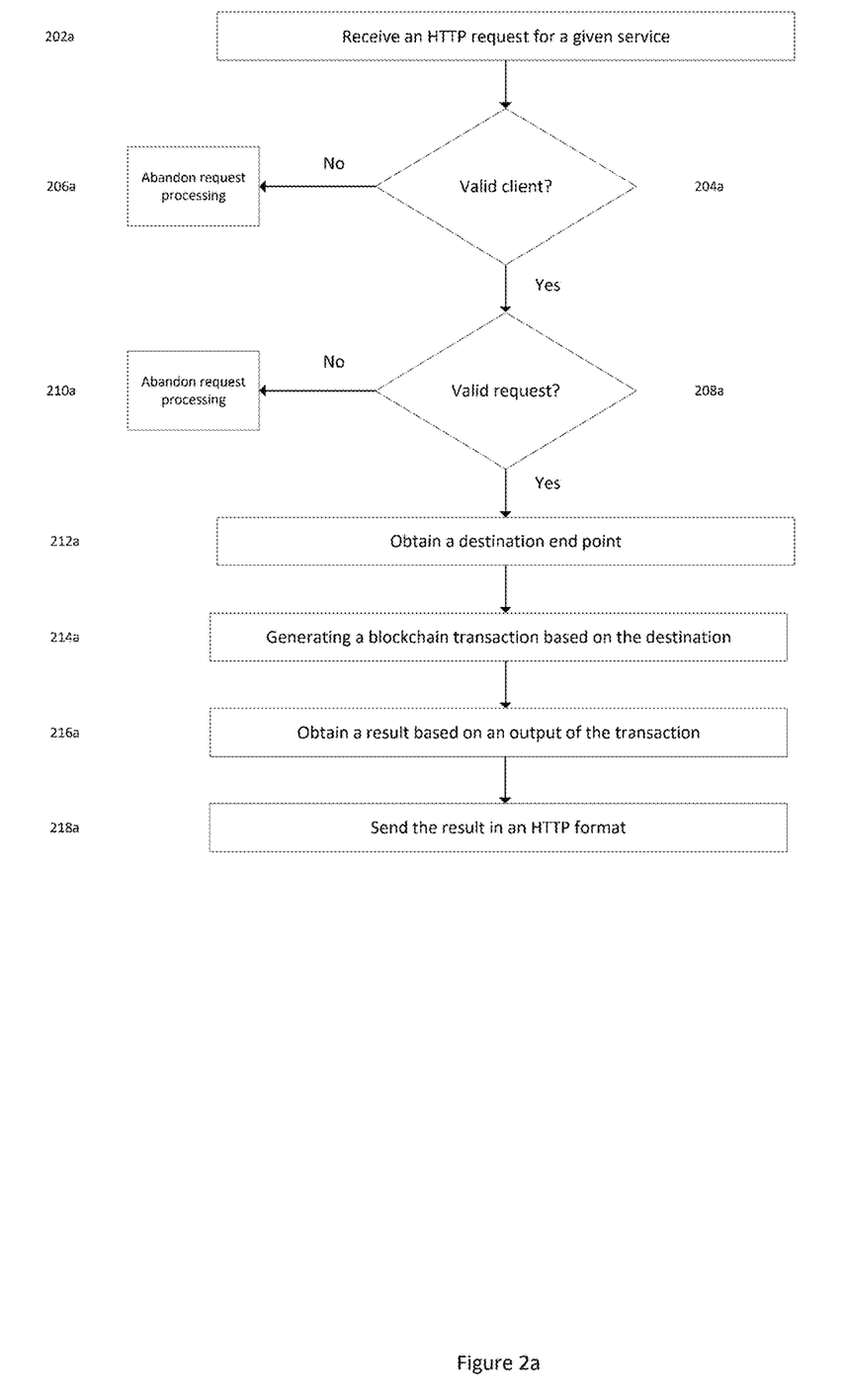
FIG. 2a is a flowchart, depicting a method for providing a platform of a plurality of services that are associated with a blockchain, according to the first aspect, as implemented by one or more processors associated with the platform.

FIG. 2*a* relates to the first aspect of the present disclosure and depicts a computer implemented method for providing a platform of a plurality of services that are associated with a blockchain, such as the platform 100 shown in FIG. 1. The method of FIG. 2*a* is implemented by a platform processor associated with an application programming interface (API).

Step 202*a* depicts receiving a request from a given client among the plurality of clients. In some embodiments, the client may be one or more computing devices, resources or processors associated with a client, said client having signed up or registered to access the plurality of services that are provided by the platform processor. As mentioned above, the platform processor may be one or more processors, each offering a different type of function or service to be implemented using a blockchain, such as the Bitcoin SV blockchain (such as a processor for the data, compute and commerce services seen in FIG. 1). It is also possible for there to be just one processor for a single service. As the platform processor is associated with an API endpoint, such as a URI for the platform, the request from the given client can be based on a standard Internet protocol such as the Hypertext Transfer Protocol (HTTP) transmission protocol format. In some embodiments, the request may include an identifier for the client as well as an identifier for the service requested.

In step 204*a* the identity of the client is checked to see if the client is a valid client registered to use the platform processor and the functionality offered by it. In some embodiments, this may be based on known authentication methods such as password protected login authentication or the like. In this case, a record may be created for the given client based on a client identifier or alias included in the request, and a password. Validation may be based on a password received at the API matching the password in the record. In other embodiments, standard PKI techniques based on cryptographic private/public key pairs may also be used to validate a digital signature that is present in the request received form the client in step 202*a*. In this case, the identity of the client can be verified by checking if request signed by the private key can be successfully recovered or validated using the public key.

If the client identity cannot be verified or verification fails, then in step 206*a* the request is not processed any further.

If the client is validated successfully, then in step 208*a*, the validity of the request for the service in step 202*a* is then checked. This step is to ensure that the given client is indeed authorised to avail the service requested. The permission or attributes for this may be present in the record for the client, to indicate one or more types of access levels or service that can be provided or not to a respective client.

If the request is found to be disallowed or invalid for the requesting client, then in step 210*a* the request is not processed any further.

It is to be understood that the embodiments of validating the client and/or service set out above are not essential for the operation of the first aspect, although it is useful. In some cases only the validation in steps 204*a* or 208*a* may be performed. In some cases no validation is performed. In this case, any client, whether registered or not, can use the service or platform upon appropriate payment for such access.

In step 212*a*, a destination address, which may be an endpoint URI for a server or processor that is responsible for implementing the requested service in step 202*a*, is obtained. In some embodiments, where there are a plurality of platform processors, a host server or platform API may covert the received request to a Remote Procedure Call (RPC) format to be sent to the destination address associated with the processor that is configured to implement the service identified.

In step 214*a*, the service requested is processed by the respective platform processor responsible for it. A blockchain transaction is either obtained or read or generated by the platform processor based on destination address/endpoint of the responsible processor, and an output script for this transaction is obtained. While FIG. 2*a* refers to generating a blockchain transaction in this step, it will be understood that the first aspect of the present disclosure is not so limited. If the request in step 202*a* is to read or get data from the blockchain, then a transaction may not be generated, it can simply be read or obtained from the blockchain. There may be a plurality of blockchain transactions or multiple output scripts for one or more of the blockchain transactions generated.

In step 216*a* the output scripts may include data outputs as the result (for instance there may be a data carrier UTXO), or the result may be obtained based on the transaction identifiers or remaining outputs of the transaction. There may also be a non-spendable OP-RETURN output that is associated with the transaction from which the result can be obtained.

In step 218*a*, the result associated with the output script is provided to the given client in a HTTP or similar transmission protocol format. In some embodiments, if the responsible processor for the service is located remotely to the host platform API, then the platform processor receives the response associated with the blockchain transaction(s) from the responsible processor in an RPC format. An API converter then converts this to a message that can be sent based on the HTTP format, before sending it to the client. As mentioned above, if the client used an alias addressing service, such as bsvalias, then the result is sent in a HTTP message addressed to the alias for the client in a format that is dictated by the bsvalias machine readable resource.

Figure 2B:
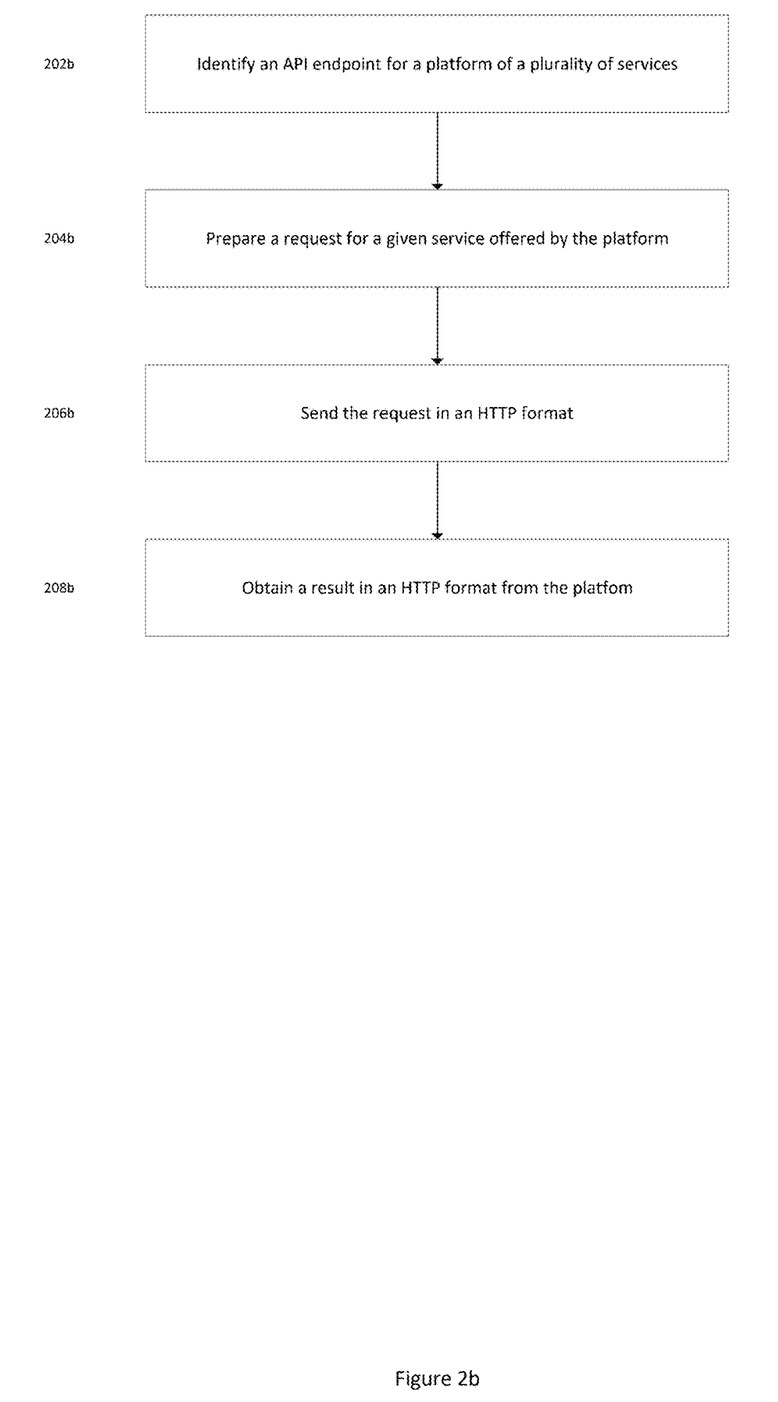
FIG. 2b is a flowchart, depicting a method for accessing a platform of a plurality of services that are associated with a blockchain, according to the first aspect, as implemented by one or more processors associated with a client.

FIG. 2b relates to the first aspect of the present disclosure and depicts a computer implemented method for accessing a platform of a plurality of services that are associated with a blockchain, such as the platform 100 shown in FIG. 1. The method of FIG. 2b is implemented by one or more processors associated with a client.

In step 202b, the application programming interface (API) endpoint associated with the platform is identified. As mentioned before, this may be the API associated with a host platform processor, and there may be one or more further processors responsible for implementing the service—each with their own service endpoint or a destination address.

In step 204b, the client prepares a request for a service, such as the data writing service 102 in FIG. 1. The client in some embodiment includes a client alias or identifier and/or a service identifier in the request, so that it can be routed to the correct service endpoint. This is useful for checks by the platform processor regarding the validity of the requesting client and the client's permission to use the requested service.

In step 206b, the request prepared in step 204b is sent using a Hypertext Transfer Protocol (HTTP) or similar transmission protocol format, as the platform processor is implemented as a HTTP or REST API.

In step 208b, the result that pertains to an output script of a blockchain transaction associated with the request is provided from the platform processor. This result is provided to the client in the HTTP transmission protocol format.

Advantageously, with the methods of the first aspect, a request for blockchain based services is sent and received by the client in the HTTP transmission protocol format, and therefore the client can make use of all advantages and services unique to a blockchain, without having to implement any transaction capability or blockchain libraries. This is because the service is offered via a platform API, which may be a HTTP or REST API endpoint. For example, REST API design standards can process HTTP requests and communication using the following HTTP commands over the Internet—and this is all the functionality that is required by the client, i.e. to be able to send and receive messages over the Internet. The platform processor(s) implement the commands remotely, or separately for the client.

| Commands | GET | POST | PUT | DELETE | PATCH |
|---|---|---|---|---|---|
| Resource | read | create | update or create | delete | partial update |

Figure 3:
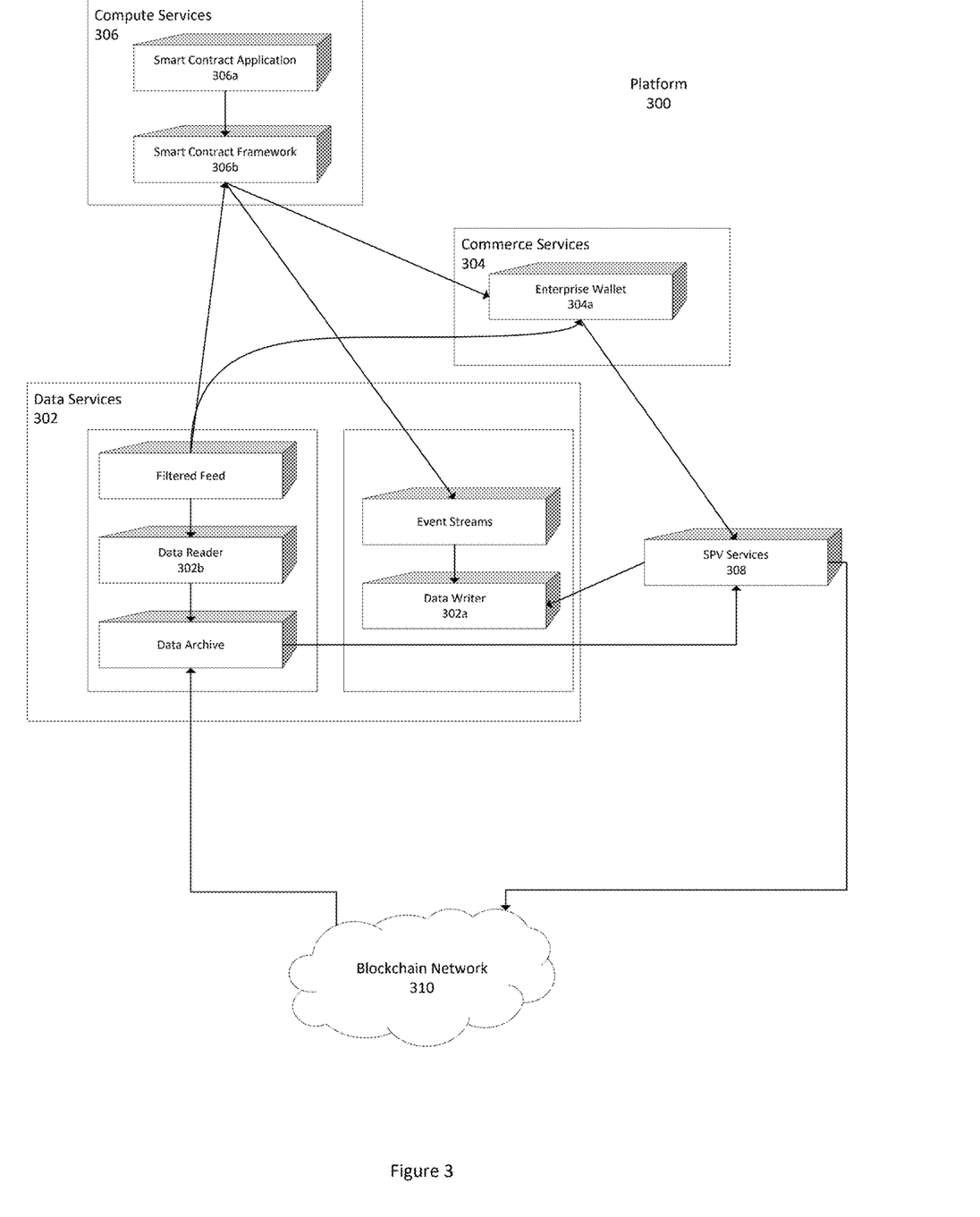
FIG. 3 is a schematic diagram, depicting the components of the platform of a plurality of services that are associated with a blockchain, according to the first aspect.

FIG. 3 provides a more granular schematic view of the plurality of services associated with a blockchain, and which can be implemented by the platform 300 that is associated with an API via which any one or more of the offered services can be accessed. As seen in this Figure, the data services 302 may include a data writer 302a and a data reader service 302b. The implementation of event streams using the data writer service 302a will be explained in detail in Figure, to enable clients to write data into the blockchain in a simple, secure and optimised manner. The data reader service 302b enables the clients to send queries, which returns data that is stored in the blockchain. This may be using Filtered streams in which the client may pre-define the type of data that they wish to read from the blockchain on an ad hoc or periodic basis, i.e. within certain timeframe, or those associated with a set of related or unrelated events or documents that are processed in the blockchain 310. The data archive feature allows access to logs of previous transaction for a specified event or contract.

The compute services 306 of the platform 300 includes an application 306a and framework 306b associated with smart contracts, which in some embodiments may be represented as a state machine in the blockchain 310. For instance, the compute services may manage smart contracts associated with the blockchain for a client associated with platform services. The compute services 306 interacts with the data services 302 as data will need to be input and results provided to a client for any such computation.

Commerce services 304 are responsible for provision of enterprise-class capabilities via enterprise wallets 304a for transacting over the blockchain 310, based on best-in-class security practices and technologies. For example, in some embodiments enterprise wallets may implement functionality to enable blockchain transaction processing when more than one person or user or account may need to sign off on a transaction meeting a defined criterion. i.e. associated with cryptocurrency of a large value above a certain predefined limit. An enterprise wallet may also include functionality to implement a threshold number and/or type of signatures to move large amounts of digital assets such as cryptocurrency or tokens representing another resource. The movement of these assets can then be represented on the blockchain following processing based on the criteria applied by such enterprise wallet implementation.

The SPV services 308 (simplified payment verification) are applications that require information from the blockchain but do not include direct links to it, as they do not run a miner node. Such SPV service 308 allows a lightweight client to verify that a transaction is included in a blockchain, without downloading the entire blockchain 310. This can be advantageous where an observer may receive a version of an event stream (discussed below in the second aspect) using a different API, such as one associated with simple payment verification (SPV) for transaction verification. In this configuration, the platform service may act as an SPV server, and the observer receiving the version, i.e. a replica, of the event stream for the purpose of verification, may be an SPV client. SPV services 308 therefore can improve the scalability and efficiency, as well as reduce complexity of the network. In combination with the use of channels (see channel services below), the delivery and verification of data between peers can be greatly improved.

The present disclosure also relates to a computer implemented method for implementing a channel service for one or more clients, the method implemented by a channel processor and comprising the steps of receiving a request from a given client among the one or more clients, the request pertaining to the creation of a channel and providing the given client access to one or more functions that enable direct communication between the given client and another entity via the channel. Channel service can be offered in combination with SPV services 308, or as a separate service within the platform 300. The method includes storing and/or providing one or more notifications associated with the channel for the given client.

Advantageously, the use of channels enables direct or peer-to-peer communication for clients, by methods, devices, and systems which provide an interface or functions for a channel or a messaging service, without such clients needing to implement any processing or functionality for the blockchain, while still being able to avail all advantages associated with it.

The channel service may be provided by a separate channel processor, or may be provided by the above-mentioned platform or platform processor, or may be integrated with the client, or may be implemented separate to/independent from the client and/or the platform. Channels enables direct or peer-to peer communication paths or sessions between entities for the transfer of messages or data, which may for example be required for verification. An example of the channel service and/or channel processor is described in detail in UK patent application no. 2007597.4 filed in the name of nChain Holdings Limited, the subject matter of which is herein incorporated by reference.

In addition to the above, storage services may also be provided via the platform 300. In some embodiments, any underlying data associated with the platform may optionally be stored in a separate and/or geo-fenced storage option provided for clients of the platform service. This may be used to store data required for verification of any blockchain transaction that is associated with the platform, or for secure retrieval of data that is associated with a client or in relation to a smart contract. Geo-fenced data storage advantageously ensures that the data can be held in accordance with local laws (e.g. GDPR), and therefore this enables the platform/service provider for the platform 300 to have some legal or otherwise accountability for the data that is held in the storage.

Figure 4:
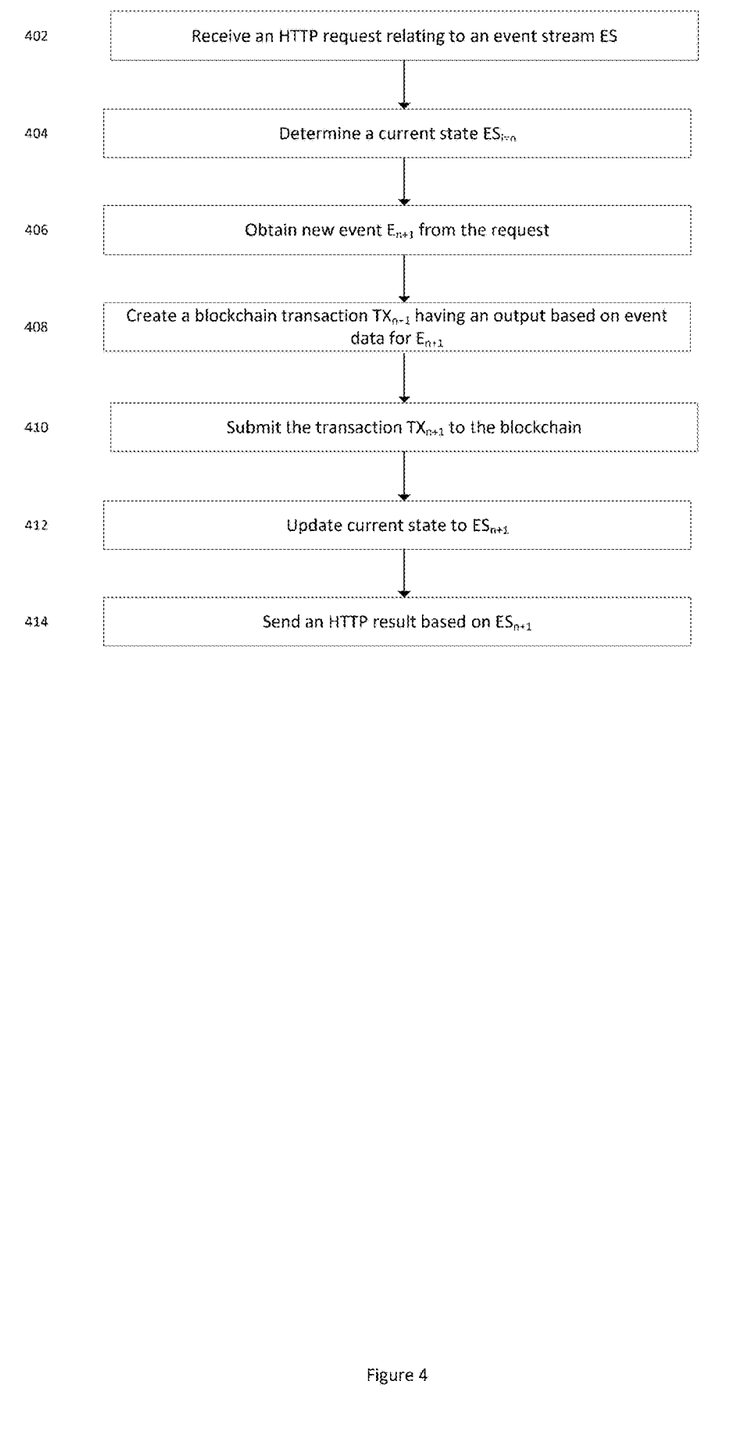
FIG. 4 is a flowchart, depicting a method for implementing a data-writing service for transactions associated with a blockchain, according to a second aspect, as implemented by one or more processors associated with a platform service.

Second Aspect—a Platform Providing a Data Writing Service Associated with a Blockchain FIG. 4 relates to a second aspect of the present disclosure and depicts a computer implemented method for providing a data writing service for transactions that are associated with a blockchain, such as the data writer 302a seen in FIG. 3 of the first aspect. The method of FIG. 3 is implemented by a platform processor associated with an application programming interface (API) for the service.

Step 402 depicts receiving a request from a client, the request relating to an event stream ES implemented using a blockchain. The request from the client being in a Hypertext Transfer Protocol (HTTP) transmission protocol format, as with the first aspect. In some embodiments, the event stream relates to a state machine, and represents a machine-readable contract or smart contract that is implemented as a finite state machine in the blockchain. A Finite state Machine (FSM) is a well-known mathematical model of computation. It is an abstract machine that can be in exactly one of a finite number of states at any given time. The FSM can change from one state to another in response to some external inputs—the change from one state to another is called a transition. An FSM may be defined by a list of its states, its initial state, and the conditions for each transition. In the Bitcoin SV Blockchain the UTXO set can be thought of as a state machine, with a given output's spent state being a function of previous inputs to the transaction (the machine). Thus, by replaying all transactions, the current spend state of any output, and the current contents of the UTXO set, can be established deterministically using the blockchain. Thus, in the embodiment of FIG. 4, the request can be considered as a request to alter a current state of a smart contract, implemented as an event stream ES in the blockchain.

Step 404 depicts determining a current state of the event Stream $ES_{i=n}$, by the data writer or a platform processor for implementing the data writing service. Let us consider that i is an integer from 0 to N, each integer i representing a given state of the event stream ES having a finite number of states, whereby i=0 represents the created event stream ES, i=n represents the event stream ES in a current state in the blockchain, and i=N represents a final state of the event stream ES. Thus the current state of the event stream ES would be $E_n$.

Step 406 depicts identifying or obtaining data associated with a next or new event $E_{n+1}$ for the event stream ES based on the received request in step 402. In this embodiment, the new event may be data or a function to trigger an alteration of a state so that the event stream transitions to the next state.

Step 408 depicts the step of creating a blockchain transaction $TX_{n+1}$ for a next event $E_{n+1}$ by one or more processors associated with the platform processor implementing the data writer. The blockchain transaction $TX_{n+1}$ includes at least:
- an input associated with a transaction output ($TXO_n$) from a previous transaction $TX_n$. This input spends the $TXO_n$ output from the previous transaction.
- an unspent output ($UTXO_{n+1}$) associated with event data representing the new event $E_{n+1}$. In some embodiments this is a data output, i.e. representing a data carrier element of the transaction.

There may be additional inputs, such as fund inputs to cover network mining fees as appropriate, and there also may be other outputs, such as change outputs for the transaction.

Step 410 depicts submitting the transaction $TX_{n+1}$ created in step 408 to the blockchain. Here the transaction may be submitted to the blockchain, such as the Bitcoin SV network for inclusion in a subsequent block by a miner node or BSV node software associated with the platform processor.

Step 412 depicts updating the current state of the event stream ES to now be $ES_{i=n+1}$ based on the newly created event $E_{n+1}$, such that $ES_{i=n}=ES_{n+1}$. This corresponds to the latest transaction $TX_{n+1}$ submitted to the blockchain for ES. In some embodiments, the new state is identified and updated based on the event data output in the final transaction output $UTXO_{n+1}$.

Step 414 depicts sending a result based on the updated current state $ES_{n+1}$ in step 412, the result being provided based on the HTTP transmission protocol format to the client.

Figure 5:
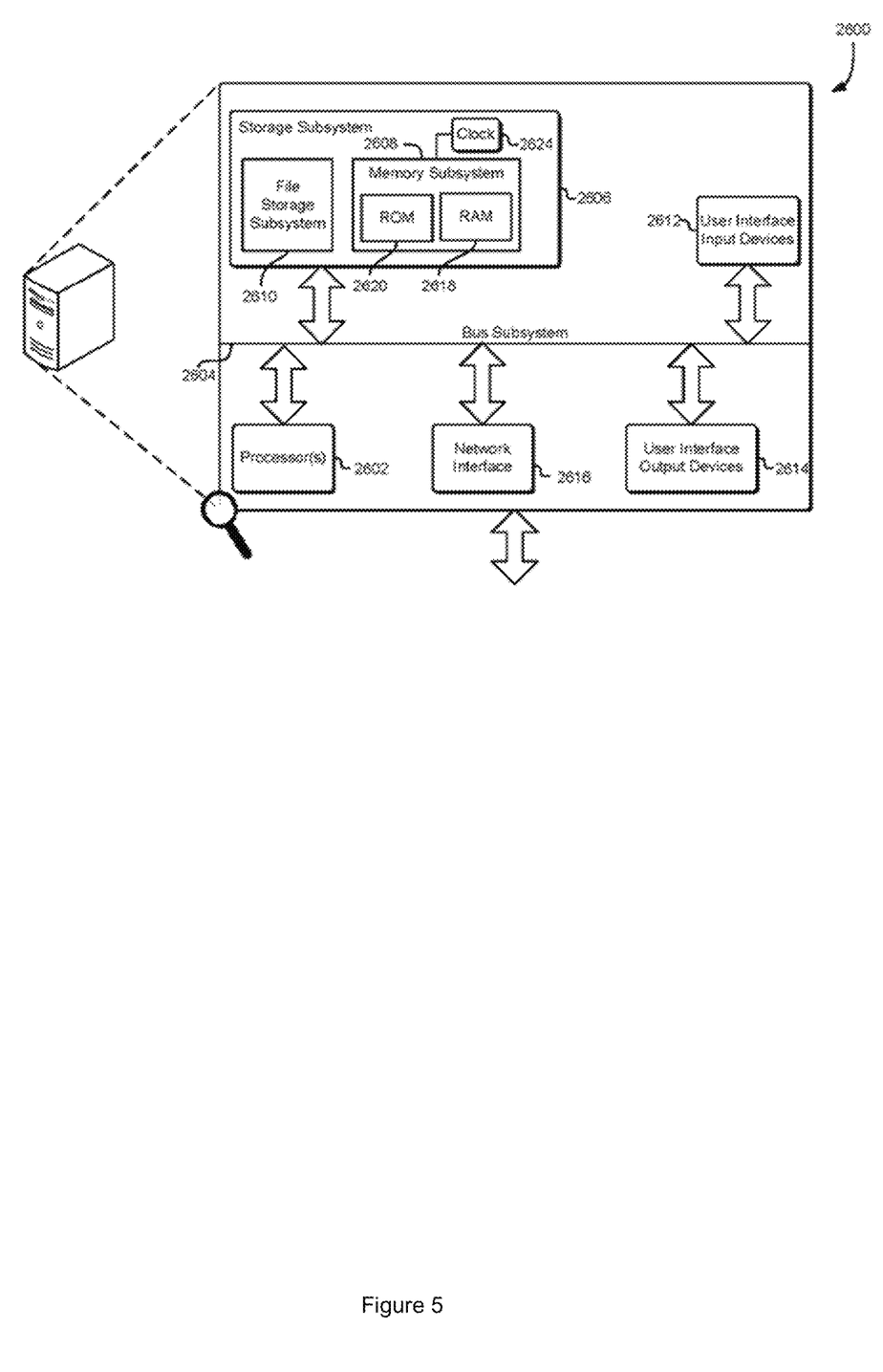
FIG. 5 is a schematic diagram, illustrating a computing environment in which various aspects and embodiments of the present disclosure can be implemented.

Turning now to FIG. 5 there is provided an illustrative, simplified block diagram of a computing device 2600 that may be used to practice at least one embodiment of the present disclosure. In various embodiments, the computing device 2600 may be used to implement any of the systems illustrated and described above. For example, the computing device 2600 may be configured to be used as one or more components of DBMS of figure, or the computing device 2600 may be configured to be a client entity that is associated with a given user, the client entity making database requests for a database that is managed by the DBMS of FIG. 5. Thus, computing device 2600 may be a portable computing device, a personal computer, or any electronic computing device. As shown in FIG. 5, the computing device 2600 may include one or more processors with one or more levels of cache memory and a memory controller (collectively labelled 2602) that can be configured to communicate with a storage subsystem 2606 that includes main memory 2608 and persistent storage 2610. The main memory 2608 can include dynamic random-access memory (DRAM) 2618 and read-only memory (ROM) 2620 as shown. The storage subsystem 2606 and the cache memory 2602 and may be used for storage of information, such as details associated with transactions and blocks as described in the present disclosure. The processor(s) 2602 may be utilized to provide the steps or functionality of any embodiment as described in the present disclosure.

The processor(s) 2602 can also communicate with one or more user interface input devices 2612, one or more user interface output devices 2614, and a network interface subsystem 2616.

A bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilise multiple buses.

The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a network such that the data technician may be able to transmit data to the device and receive data from the device while in a remote location, such as a data centre.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600.

The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. For example, the main memory 2608 and cache memory 2602 can provide volatile storage for program and data. The persistent storage 2610 can provide persistent (non-volatile) storage for program and data and may include flash memory, one or more solid state drives, one or more magnetic hard disk drives, one or more floppy disk drives with associated removable media, one or more optical drives (e.g. CD-ROM or DVD or Blue-Ray) drive with associated removable media, and other like storage media. Such program and data can include programs for carrying out the steps of one or more embodiments as described in the present disclosure as well as data associated with transactions and blocks as described in the present disclosure.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 5 is intended only as a specific example for purposes of illustrating the preferred embodiment of the device. Many other configurations having more or fewer components than the system depicted in FIG. 5 are possible.

Enumerated Example Embodiments

The present disclosure is hereby discussed based on the following clauses that are related to the above aspects, which are provided herein as exemplary embodiments for better explaining, describing and understanding the claimed aspects and embodiments.
1. A computer implemented method for providing a platform of a plurality of services that are associated with a blockchain, the platform being provided for a plurality of clients, the method implemented by a platform processor associated with an application programming interface (API), the method comprising the steps of:
receiving a request from a given client among the plurality of clients, the request pertaining to a given service among the plurality of services, the request from the given client being based on a Hypertext Transfer Protocol (HTTP) transmission protocol format;
based on a determination that the client identity and/or request is/are valid, obtaining a destination address associated with the given service;
processing the request for the given service based on at least one blockchain transaction corresponding to the obtained destination address to obtain an output script; and
sending a result associated with the output script to the given client, the result being provided based on the HTTP transmission protocol format.
2. The method as set out in clause 1 wherein platform processor is implemented as an HTTP API endpoint.
3. The method as set out in clause 2 wherein the platform processor is implemented as a Representational State Transfer (REST) endpoint.
4. The method as set out in any preceding clause wherein the platform processor comprises or is associated with a plurality of processors, each configured for implementing a given service among the plurality of services on the blockchain, and each associated with a specific destination address or endpoint that is unique to the respective processor.

5. The method as set out in any preceding wherein the platform processor is associated with an API converter, the API converter is configured for performing the steps of:
receiving the request from the given client in the HTTP transmission protocol format;
  converting a received request to a Remote procedure Call (RPC) format, and sending the RPC request to a given processor among the plurality of processors that is configured to implement the given service identified in the received request;
  receiving a response associated with at least one blockchain transaction from the given processor in an RPC format; and
  converting the respective response to be sent to the client using the HTTP transmission protocol.

6. The method as set out in any preceding clause wherein the received request is a HTTP GET or POST or PUT or PATCH request that includes or is associated with a client identifier for the given client and a service identifier for the given service requested, and wherein the result sent to the client is a HTTP POST request based on the client identifier for the given client.

7. The method as set out in clause 6 comprising validating the client based on the client identifier and a record corresponding to the client identifier, the record associated with the platform processor; and
based on a successful validation of the client, determining if the received request from the client is valid based on the service identifier and an attribute or setting included in the respective record.

8. The method as set out in clauses 6 or 7 wherein the client identifier is an alias that is provided for a given client, the alias being specific to the given client and provided by an alias-based addressing service, the addressing service having a machine readable resource that is accessible from a defined or well-known location, the machine readable resource including one or more capabilities pertaining to the given client.

9. The method as set out in clause 8 wherein the alias is associated with a domain name for the given client.

10. The method as set out in any preceding clause wherein the platform includes at least one or more of the following services implemented using the blockchain:
data services for writing/submitting data into the blockchain to alter a state of the blockchain; data services for reading/obtaining data reflecting the current state of the blockchain;
services associated with simplified payment verification for transactions associated with the blockchain;
services associated with the management of one or more event streams and/or smart contracts associated with the blockchain;
services associated with the management of a digital wallet framework for a plurality of clients associated with the blockchain;
services associated with the provision of peer-to-peer communication channels;
services associated with data storage.

11. A computer implemented method for accessing a platform of a plurality of services that are associated with a blockchain, the platform being provided for a plurality of clients, the method implemented by one or more processors of a given client among the plurality of clients, the method comprising the steps of:
  obtaining or identifying an application programming interface (API) endpoint associated with one or more processors associated with the platform;
  sending a request pertaining to a given service among the plurality of services, the request including associated with a client identifier for the given client and a service identifier for the given service requested, wherein the request is sent based on a Hypertext Transfer Protocol (HTTP) transmission protocol format; and
  receiving a result pertaining to an output script of a blockchain transaction associated with the request, said result being provided to the client based on the HTTP transmission protocol format.

12. A computer implemented method for implementing a data writing service for transactions associated with a blockchain, the method implemented by a platform processor associated with an application programming interface (API), the method comprising the steps of:
  receiving a request from a client, the request relating to an event stream ES implemented using the blockchain, the request from the client being based on a Hypertext Transfer Protocol (HTTP) transmission protocol format;
  determining a current state of the event Stream $ES_{i=n}$, wherein i is an integer from 0 to N, each integer i representing a given state of the event stream ES, whereby i=0 represents the created event stream ES, i=n represents the event stream ES in a current state in the blockchain, and i=N represents a final state of the event stream ES;
  processing a new event $E_{n+1}$ for the event stream ES based on the received request by the steps of:
  creating a blockchain transaction $TX_{n+1}$, the blockchain transaction $TX_{n+1}$ including:
    an input associated with a transaction output ($TXO_n$) from a previous transaction $TX_n$; and
    an unspent output ($UTXO_{n+1}$) associated with event data representing the new event $E_{n+1}$;
    submitting the transaction $TX_{n+1}$ to the blockchain;
    wherein, responsive to said submission the method includes updating the current state of the event stream to be $ES_{i=n+1}$ based on the newly created event $E_{n+1}$, such that $ES_{i=n}=ES_{n+1}$; and
  sending a result based on the updated current state $ES_{n+1}$, the result being provided based on the HTTP transmission protocol format.

It should be noted that the above-mentioned aspects and embodiments illustrate rather than limit the disclosure, and that those skilled in the art will be capable of designing many alternative embodiments without departing from the scope of the disclosure as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The disclosure may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

I claim:

1. A computer implemented method for implementing a data writing service for transactions associated with a blockchain, the method implemented by a platform processor associated with an application programming interface (API), the method comprising the steps of:
   receiving a request from a client, the request relating to an event stream ES implemented using the blockchain, the request from the client being based on a Hypertext Transfer Protocol (HTTP) transmission protocol format;
   determining a current state of an event Stream $ES_{i=n}$, wherein i is an integer from 0 to N, each integer i representing a given state of the event stream ES, whereby i=0 represents a created event stream ES, i=n represents the event stream ES in a current state in the blockchain, and i=N represents a final state of the event stream ES;
   processing a new event $E_{n+1}$ for the event stream ES based on the received request by the steps of:
   creating a blockchain transaction $TX_{n+1}$, the blockchain transaction $TX_{n+1}$ including:
   an input associated with a transaction output ($TXO_n$) from a previous transaction $TX_n$; and
   an unspent output ($UTXO_{n+1}$) associated with event data representing the new event $E_{n+1}$;
   submitting the transaction $TX_{n+1}$ to the blockchain, wherein, responsive to the submission of the transaction $TX_{n+1}$ to the blockchain the method includes updating the current state of the event stream to be $ES_{i=n+1}$ based on the new event $E_{n+1}$, such that $ES_{i=n}=ES_{n+1}$; and
   sending a result based on the updated current state $ES_{n+1}$, the result being provided based on the HTTP transmission protocol format.

2. The method of claim 1, wherein the platform processor is implemented as an HTTP API endpoint.

3. The method of claim 2, wherein the platform processor is implemented as a Representational State Transfer (REST) endpoint.

4. The method of claim 1, wherein the platform processor comprises or is associated with a plurality of processors, each configured for implementing a given service among the plurality of services on the blockchain, and each associated with a specific destination address or endpoint that is unique to the respective processor.

5. The method of claim 1, wherein the platform processor is associated with an API converter, the API converter is configured for performing the steps of:
   receiving the request from the given client in the HTTP transmission protocol format;
   converting a received request to a Remote procedure Call (RPC) format, and sending the RPC request to a given processor among a plurality of processors that is configured to implement the given service identified in the received request;
   receiving a response associated with at least one blockchain transaction from the given processor in an RPC format; and
   converting the respective response to be sent to the client using the HTTP transmission protocol.

6. The method of claim 1, wherein the received request is a HTTP GET or POST or PUT or PATCH request that includes or is associated with a client identifier for the given client and a service identifier for the given service requested, and wherein the result sent to the client is a HTTP POST request based on the client identifier for the given client.

7. The method of claim 6, comprising validating the client based on the client identifier and a record corresponding to the client identifier, the record associated with the platform processor; and
   based on a successful validation of the client, determining if the received request from the client is valid based on the service identifier and an attribute or setting included in the respective record.

8. The method of claim 6, wherein the client identifier is an alias that is provided for a given client, the alias being specific to the given client and provided by an alias-based addressing service, the addressing service having a machine readable resource that is accessible from a defined or well-known location, the machine readable resource including one or more capabilities pertaining to the given client.

9. The method of claim 8, wherein the alias is associated with a domain name for the given client.

10. The method of claim 1, wherein the platform includes at least one or more of the following services implemented using the blockchain:
    data services for writing/submitting data into the blockchain to alter a state of the blockchain;
    data services for reading/obtaining data reflecting the current state of the blockchain;
    services associated with simplified payment verification for transactions associated with the blockchain;
    services associated with management of one or more event streams and/or smart contracts associated with the blockchain;
    services associated with management of a digital wallet framework for a plurality of clients associated with the blockchain;
    services associated with provision of peer-to-peer communication channels;
    services associated with data storage.

11. A system, comprising:
    a platform processor, including:
    a processor, and
    a memory storing processing instructions that, when executed by the processor, cause the processor to implement a method for implementing a data writing service for transactions associated with a blockchain, wherein the platform processor is associated with an application programming interface (API), the method comprising the steps of:
    receiving a request from a client, the request relating to an event stream ES implemented using the blockchain, the request from the client being based on a Hypertext Transfer Protocol (HTTP) transmission protocol format;
    determining a current state of an event Stream $ES_{i=n}$, wherein i is an integer from 0 to N, each integer i representing a given state of the event stream ES, whereby i=0 represents a created event stream ES, i=n represents the event stream ES in a current state in the blockchain, and i=N represents a final state of the event stream ES;
    processing a new event $E_{n+1}$ for the event stream ES based on the received request by the steps of:
    creating a blockchain transaction $TX_{n+1}$, the blockchain transaction $TX_{n+1}$ including:
    an input associated with a transaction output ($TXO_n$) from a previous transaction $TX_n$; and an unspent output ($UTXO_{n+1}$) associated with event data representing the new event $E_{n+1}$;

submitting the transaction $TX_{n+1}$ to the blockchain, wherein, responsive to the submission the method includes updating the current state of the event stream to be $ES_{i=n+1}$ based on the new event $E_{n+1}$, such that $ES_{i=n}=ES_{n+1}$; and sending a result based on the updated current state $ES_{n+1}$, the result being provided based on the HTTP transmission protocol format.

12. The system of claim 11, wherein the platform processor is implemented as an HTTP API endpoint.

13. The system of claim 12, wherein the platform processor is implemented as a Representational State Transfer (REST) endpoint.

14. The system of claim 11, wherein the platform processor comprises or is associated with a plurality of processors, each configured for implementing a given service among the plurality of services on the blockchain, and each associated with a specific destination address or endpoint that is unique to the respective processor.

15. The system of claim 11, wherein the platform processor is associated with an API converter, the API converter is configured for performing the steps of:

receiving the request from the given client in the HTTP transmission protocol format;

converting a received request to a Remote procedure Call (RPC) format, and sending the RPC request to a given processor among a plurality of processors that is configured to implement the given service identified in the received request;

receiving a response associated with at least one blockchain transaction from the given processor in an RPC format; and converting the respective response to be sent to the client using the HTTP transmission protocol.

16. The system of claim 11, wherein the received request is a HTTP GET or POST or PUT or PATCH request that includes or is associated with a client identifier for the given client and a service identifier for the given service requested, and wherein the result sent to the client is a HTTP POST request based on the client identifier for the given client.

17. The system of claim 16, comprising validating the client based on the client identifier and a record corresponding to the client identifier, the record associated with the platform processor; and based on a successful validation of the client, determining if the received request from the client is valid based on the service identifier and an attribute or setting included in the respective record.

18. The system of claim 16, wherein the client identifier is an alias that is provided for a given client, the alias being specific to the given client and provided by an alias-based addressing service, the addressing service having a machine readable resource that is accessible from a defined or well-known location, the machine readable resource including one or more capabilities pertaining to the given client.

19. The system of claim 18, wherein the alias is associated with a domain name for the given client.

20. The system of claim 11, wherein the platform includes at least one or more of the following services implemented using the blockchain:

data services for writing/submitting data into the blockchain to alter a state of the blockchain;

data services for reading/obtaining data reflecting the current state of the blockchain;

services associated with simplified payment verification for transactions associated with the blockchain;

services associated with management of one or more event streams and/or smart contracts associated with the blockchain;

services associated with management of a digital wallet framework for a plurality of clients associated with the blockchain;

services associated with provision of peer-to-peer communication channels;

services associated with data storage.

* * * * *